(12) United States Patent
Veidung

(10) Patent No.: US 8,522,442 B2
(45) Date of Patent: Sep. 3, 2013

(54) HAND-HELD SAFETY APPARATUS

(76) Inventor: Arne Veidung, Eysins (CH)

( * ) Notice: Subject to any disclaimer, the term of this patent is extended or adjusted under 35 U.S.C. 154(b) by 99 days.

(21) Appl. No.: 13/133,702

(22) PCT Filed: Dec. 11, 2009

(86) PCT No.: PCT/NO2009/000429
§ 371 (c)(1),
(2), (4) Date: Jul. 6, 2011

(87) PCT Pub. No.: WO2010/068116
PCT Pub. Date: Jun. 17, 2010

(65) Prior Publication Data
US 2011/0252650 A1    Oct. 20, 2011

(30) Foreign Application Priority Data

Dec. 11, 2008  (NO) .................................. 20085185

(51) Int. Cl.
*F25C 5/16* (2006.01)
(52) U.S. Cl.
USPC .......................... 30/164.5; 30/164.6; 482/108
(58) Field of Classification Search
USPC .................... 30/1, 2, 164.5, 164.6, 366, 367; 349/539.1–539.19; 482/148, 12, 108, 93
See application file for complete search history.

(56) References Cited

U.S. PATENT DOCUMENTS

| | | | | |
|---|---|---|---|---|
| 1,701,771 A | * | 2/1929 | Stefano | 30/162 |
| 2,223,422 A | * | 12/1940 | Jones | 30/163 |
| 4,002,366 A | * | 1/1977 | Hammes | 294/26 |
| 4,476,597 A | * | 10/1984 | Gobbi | 7/159 |
| 4,815,997 A | * | 3/1989 | Forsmark et al. | 441/82 |
| 5,600,914 A | * | 2/1997 | Tatar | 43/6 |
| 5,791,056 A | * | 8/1998 | Messina | 30/361 |
| 6,009,626 A | * | 1/2000 | Lei | 30/367 |
| 6,551,159 B1 | * | 4/2003 | Spinelli et al. | 441/80 |
| 6,666,566 B1 | * | 12/2003 | Uke | 362/202 |
| 2001/0026240 A1 | * | 10/2001 | Neher | 342/357.07 |
| 2003/0192187 A1 | * | 10/2003 | Bean | 30/164.6 |
| 2008/0030323 A1 | * | 2/2008 | Katzer | 340/539.13 |
| 2009/0150063 A1 | * | 6/2009 | Geelen | 701/201 |
| 2010/0056340 A1 | * | 3/2010 | Ellis et al. | 482/4 |
| 2010/0330875 A1 | * | 12/2010 | Severson | 446/454 |
| 2011/0047764 A1 | * | 3/2011 | Strasser | 24/599.5 |
| 2012/0103277 A1 | * | 5/2012 | Klein | 119/770 |

* cited by examiner

*Primary Examiner* — Sean Michalski
(74) *Attorney, Agent, or Firm* — Abelman, Frayne & Schwab

(57) ABSTRACT

A handheld safety device (10), where the safety device comprises an elongated, partial internal hollow body (12), to be placed in a hand of a person, and a release mechanism designed to move out a spring loaded awl (14) or similar tool from the hollow body. The device is equipped with light and sound alarm. The device comprises removable weights. The device contains a tracking equipment to localize the device and a transmitter that transmits an alarm signal to an alarm center.

8 Claims, 1 Drawing Sheet

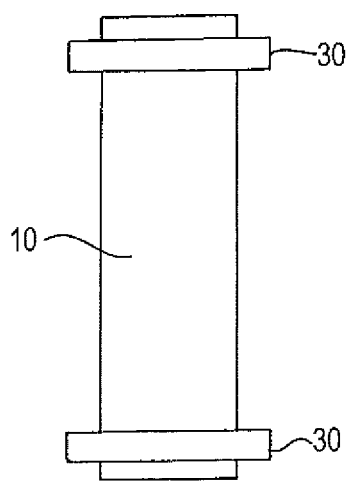
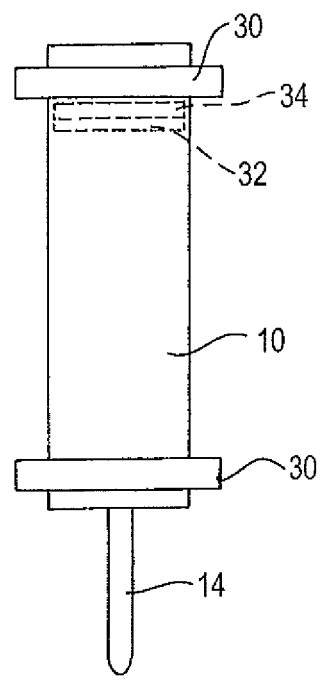
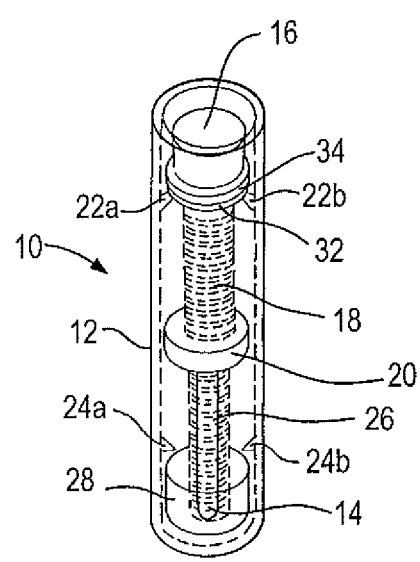

HAND-HELD SAFETY APPARATUS

The present invention relates to a hand-held safety apparatus comprising an elongated body, internally hollow, at least partially, arranged to fit into the hand of a person.

There are many situations where a person's life can be in danger. Such situations can, for example, be falling through the ice, a boat capsizing, being attacked by an animal, etc. When situations of this kind occur they can lead to fatal consequences if the person concerned does not, for example, manage to get out from the cold water and back onto the ice. More often than not, one will not be equipped with aids that can help to get out of the dangerous situation.

A mountain climber has rope with him, an ice pick and other necessary equipment. Similarly, a diver brings a knife with him to get out of dangerous situations where the diver may get stuck. This is not the case for most people, for example, during a Sunday walk across the ice or a Sunday trip with the boat, or any time for that matter. The disadvantage with accidents is that one never knows when they will occur.

A hand-held device equipped with a tool is known from CH 254609, where the user presses a button so that the tool is driven out of a housing with the help of a force from a spring.

U.S. Pat. No. 1,701,771 describes a tool in the form of an ice pick, comprising a hollow housing with an awl shaped body which is fastened to a head that can be moved in the housing between an active and an inactive position.

Therefore, there is a need for a simple and cheap aid that can save a person from dangerous situations and which is easy to bring along. Furthermore, the safety equipment must be better suited to cut into the ice than the known solutions.

Said objects are reached with a hand-held safety apparatus according to the present invention. The apparatus is simple to carry as it can be manufactured so that it is small enough to fit into a pocket of a jacket or trousers. It is so light that it can also be carried in a string around the neck, corresponding to the money bags that many people use on holiday. Alternatively, the safety apparatus can be fastened to a wristband.

The hand-held safety apparatus, according to the invention, comprises an elongated body, internally hollow, at least in part, arranged to fit into the hand of a person, and an operative release mechanism arranged to drive out a spring loaded awl or the like from the hollow body.

The safety apparatus will thus be able to contribute to a person being able to, for example, pull himself out of a hole in the ice and thus save his life, much like with the use of an ice pick. Correspondingly, the apparatus can be used as a pointed weapon when attacked by animals. The application areas for the hand-held safety apparatus are thus unlimited, as it can also be used in all situations where there is a need for such a tool.

In alternative embodiments, the release mechanism of the safety apparatus can comprise a push button at the end of the body, where the push button is arranged to release a spring to drive out said awl or the like from the other end of the hollow body. Thus, when in an inactive state, the apparatus is relatively compact and simple to bring along.

Furthermore, the spring can be arranged to drive a piston, to which the awl or the like is fastened, longitudinally in the hollow body. The hollow body can comprise a number of locking devices to restrict the wandering of the piston and to lock the piston securely in the inactive state and after the piston has been released.

To simplify the retraction of the awl, amongst other things, a second spring can be arranged around the awl or the like, where the second spring is designed to dampen the movement of the awl and/or contribute to drive the awl back into the hollow body. The second spring can rest in a sleeve or stop-lock near the opening of the hollow body.

To be useful in dangerous situations or in other incidents, the safety apparatus can be equipped with light and/or means to generate an alarm sound.

The safety apparatus can be equipped with removable weights, for example, so that it can also function as a training apparatus whilst walking when it is held in one's hand.

Furthermore, the apparatus can comprise tracking equipment for finding the bearings of the safety apparatus. The operable release mechanism can also be fitted to a transmitter that sends out an alarm signal to an alarm centre.

It can also be manufactured simply and compactly as the apparatus can be designed with a length of 6 to 15 cm and a diameter of 10 to 30 mm.

The invention shall now be described in detail with the help of an example embodiment as shown in the enclosed figures, in which:

FIGS. 1 and 2 shows an outline of a safety apparatus in inactive and active state, respectively.

FIG. 3 shows a partial section of a safety apparatus according to the invention.

As the figures show, the hand-held safety apparatus 10 comprises an elongated body 12. One of the big advantages with the safety apparatus is that it can be quickly re-set from an inactive to an active and lifesaving state. For this purpose, the body 12 is equipped with an operable push button 16 at one end of the body 12, in this case at the top of the apparatus, where the push button is arranged to release a spring 18 to drive an awl 14 or the like out of the other end of the hollow body.

The spring 18 is arranged to drive a piston 20, to which the awl 14 or the like is fastened longitudinally in the hollow body. Internally, the hollow body can comprise a number of locking devices 22a, 22b in an upper part of the body and a number of locking means 24a, 24b in an area adjoining a lower part of the body. The aim of the locking devices is to restrict the wandering of the piston 20 and to lock the piston securely in an inactive state and after the piston has been released. Thus, the locking devices will adjust the stroke length of the piston 20.

At the same time, a second spring 26 can be arranged around the awl or the like, where the second spring is arranged to dampen the movements of the awl 14 and/or contribute to drive the awl back into the hollow body 12 after activation of the push button 16. The second spring 26 can rest in a sleeve or stop-lock 28 near an opening of the hollow body 12.

To be able to contribute further, and not only in emergency situations, the safety apparatus 10 can be equipped with a light and/or means to generate an alarm sound. Furthermore, the apparatus can comprise tracking equipment to find the bearings of the safety apparatus 10 in critical situations. This can, for example, be a transmitter that sends out a radio wave signal which can be received by radio wave equipment for the determination of the coordinates of the safety apparatus in a known way. Alternatively, the safety apparatus can be equipped with a GPS transmitter, so that it can determine the position of the safety apparatus in a similar fashion. This will be particularly useful when the apparatus is used outside densely populated areas, but can also be of use in urban areas. One or more of the above mentioned alarms or transmitters can be connected up to an alarm centre, in a known way. Upon the activation of the safety apparatus, the rescue operation can thereby be set in motion immediately. In this context, it may also be appropriate that the safety apparatus is equipped with a reset button so that the alarm centre can be told that the danger is over and that the rescue operation can be discontinued.

The safety apparatus can also be equipped with, for example, removable weights 30, so that it can also function as a training appliance when one is out walking. That one has a device with weights in each hand will give an important contribution to the training when out walking. The weights can be screwed, or clipped, onto the safety apparatus, but such that they are not interfering with the function of the apparatus. Other means of fastening can also be used, for example, Velcro or straps/bands. The release mechanism of the safety apparatus, as discussed previously, is fitted to an alarm 32 and a transmitter 34 that sends and alarm signal to an alarm center.

In a preferred embodiment, the safety apparatus can be designed with a length of 6 to 15 cm and a diameter of 10 to 30 mm, while other dimensions can, of course, be possible.

It shall be mentioned that although a spring/piston arrangement is used in the embodiment described here, other solutions can also be used in which a relatively sharp item can be driven out through a body with the help of a release mechanism.

The invention claimed is:

1. Hand-held training and safety apparatus (10) comprising an elongated body (12), internally hollow, at least in part, arranged to fit in the hand of a person, the safety apparatus has an operable release mechanism arranged to drive out a spring loaded awl (14) from the hollow body, and said release mechanism comprises an operable push button (16) at one end of the body (12), where the push button is arranged to release a spring (18) to drive out said awl (14) from the other end of the hollow body, characterized in that the apparatus is equipped with removable weights, tracking equipment for finding the bearings of the safety apparatus (10), and a transmitter to send out an alarm signal.

2. Apparatus (10) according to claim 1, characterized in that the spring (18) is arranged to drive a piston (20), to which the awl (14) is fastened, longitudinally in the hollow body.

3. Apparatus (10) according to claim 1, characterized in that the hollow body comprises a number of locking means (22a, 22b, 24a, 24b) to restrict the movements of the piston (20) and to lock the piston securely in an inactive state and after the piston has been released.

4. Apparatus (10) according to claim 1, characterized in that a second spring (26) is arranged around the awl (14), where the second spring is arranged to dampen the movements of the awl (14) and/or contribute to drive the awl back into the hollow body (12).

5. Apparatus (10) according to claim 4, characterized in that the second spring (26) lies in a sleeve or stop-lock (28) near the opening of the hollow body (12).

6. Apparatus (10) according to claim 1, characterized in that the apparatus is equipped with a light and/or means to generate an alarm sound.

7. Apparatus (10) according to claim 1, characterized in that the apparatus is designed with a length of 6 to 15 cm and a diameter of 10 to 30 mm.

8. Apparatus (10) according to claim 1, characterized in that the transmitter sends out an alarm signal to an alarm center.

* * * * *